United States Patent [19]
Takao et al.

[11] Patent Number: 5,400,159
[45] Date of Patent: Mar. 21, 1995

[54] LIQUID CRYSTAL DEVICE HAVING ALIGNMENT FILM WITH PARTICULAR SURFACE ENERGY DIFFERENCE BEFORE AND AFTER RUBBING

[75] Inventors: Hideaki Takao, Sagamihara; Masanobu Asaoka, Yokohama; Makoto Kojima, Hino, all of Japan

[73] Assignee: Canon Kabushiki Kaisha, Tokyo, Japan

[21] Appl. No.: 180,459

[22] Filed: Jan. 12, 1994

Related U.S. Application Data

[62] Division of Ser. No. 925,200, Aug. 6, 1992, abandoned.

[30] Foreign Application Priority Data

Aug. 6, 1991 [JP] Japan .................. 3-219385
Oct. 30, 1991 [JP] Japan .................. 3-310129

[51] Int. Cl.⁶ .................. G02F 1/133; G02F 1/1337
[52] U.S. Cl. .................. 359/76; 359/75; 359/100
[58] Field of Search .................. 359/56, 75, 76, 77, 359/78, 100, 99; 428/1; 345/87, 97

[56] References Cited

U.S. PATENT DOCUMENTS

| | | | |
|---|---|---|---|
| 4,105,298 | 8/1978 | Levine et al. | 359/76 |
| 4,367,924 | 1/1983 | Clark et al. | 350/334 |
| 4,561,726 | 12/1985 | Goodby et al. | 350/341 |
| 4,655,561 | 4/1987 | Kanbe et al. | 350/350 S |
| 4,939,003 | 7/1990 | Aoki et al. | 359/75 |
| 5,013,137 | 5/1991 | Tsuboyama et al. | 359/100 |
| 5,129,727 | 7/1992 | Hanyu et al. | 359/75 |
| 5,153,755 | 10/1992 | Higa | 359/75 |
| 5,186,985 | 2/1993 | Estes et al. | 359/75 |
| 5,188,870 | 2/1993 | Brosig | 359/75 |
| 5,189,536 | 2/1993 | Hanyu et al. | 359/100 |
| 5,192,596 | 3/1993 | Hanyu et al. | 359/75 |

OTHER PUBLICATIONS

Williams et al "Alignment of Chiral Smectic Liquid Crystals" J. Phys. D: Applied Phys. 19 (1986)–pp. L37–L41.

*Primary Examiner*—William L. Sikes
*Assistant Examiner*—Tai V. Duong
*Attorney, Agent, or Firm*—Fitzpatrick, Cella, Harper & Scinto

[57] ABSTRACT

A liquid crystal device is constituted by a pair of substrates, and a liquid crystal disposed between the substrates. At least one of the substrates has thereon an alignment film. The alignment film is characterized in that (1) it has a surface energy of at most 35 dyne/cm before rubbing and has been rubbed to have a refractive index anisotropy of at least 0.02, or (2) it has been rubbed to have a surface energy difference $\Delta E$ of at least 9 dyne/cm and a difference $\Delta \delta$ in dispersion term of the surface energy of at least 6 dyne/cm between before and after the rubbing. The alignment film is effective in providing a high contrast and decreasing a delay in optical response causing after-image.

15 Claims, 8 Drawing Sheets

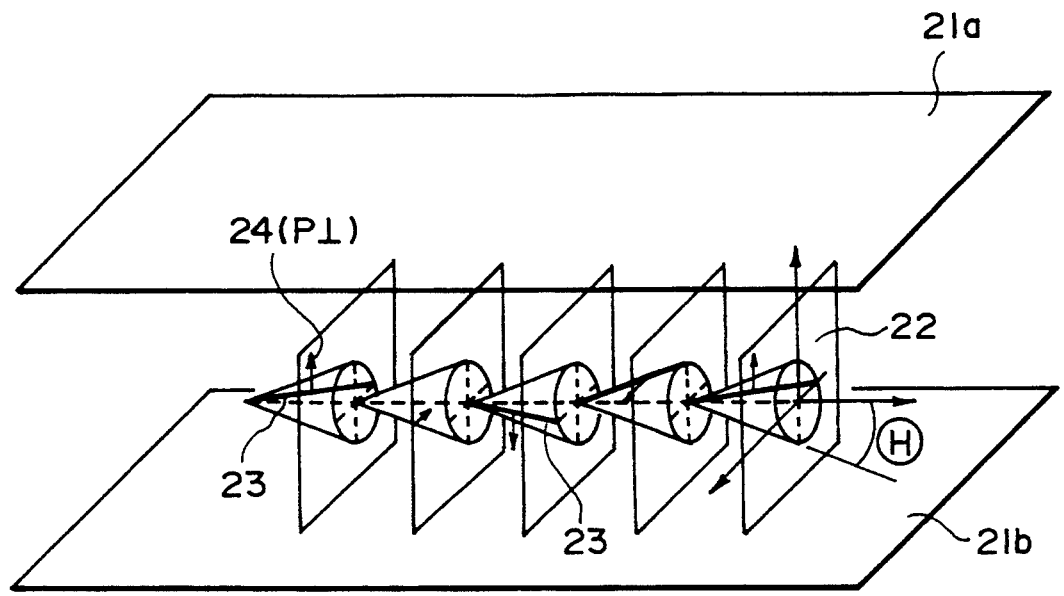
F I G. 2
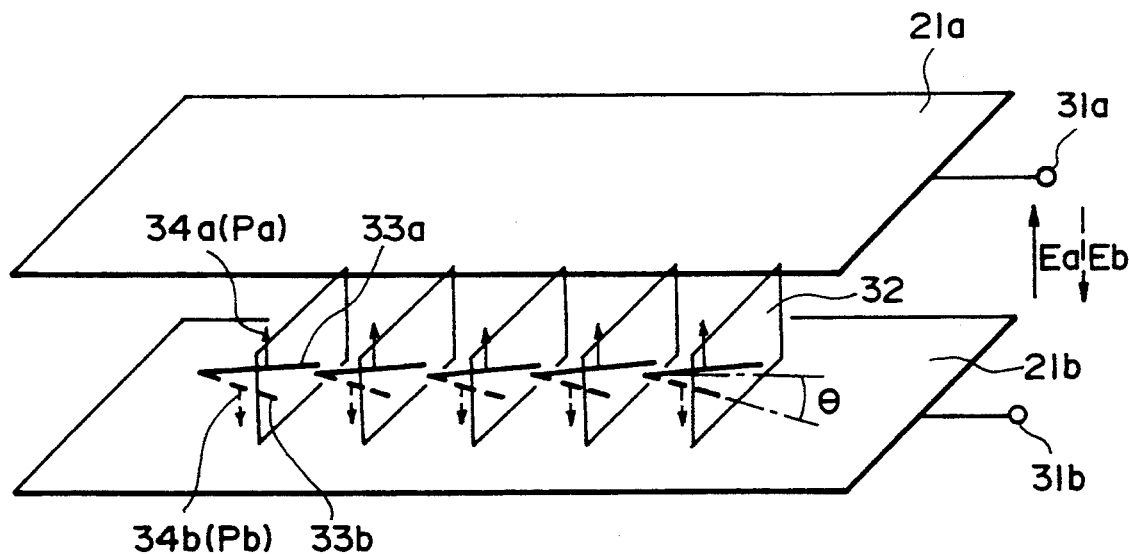
F I G. 3

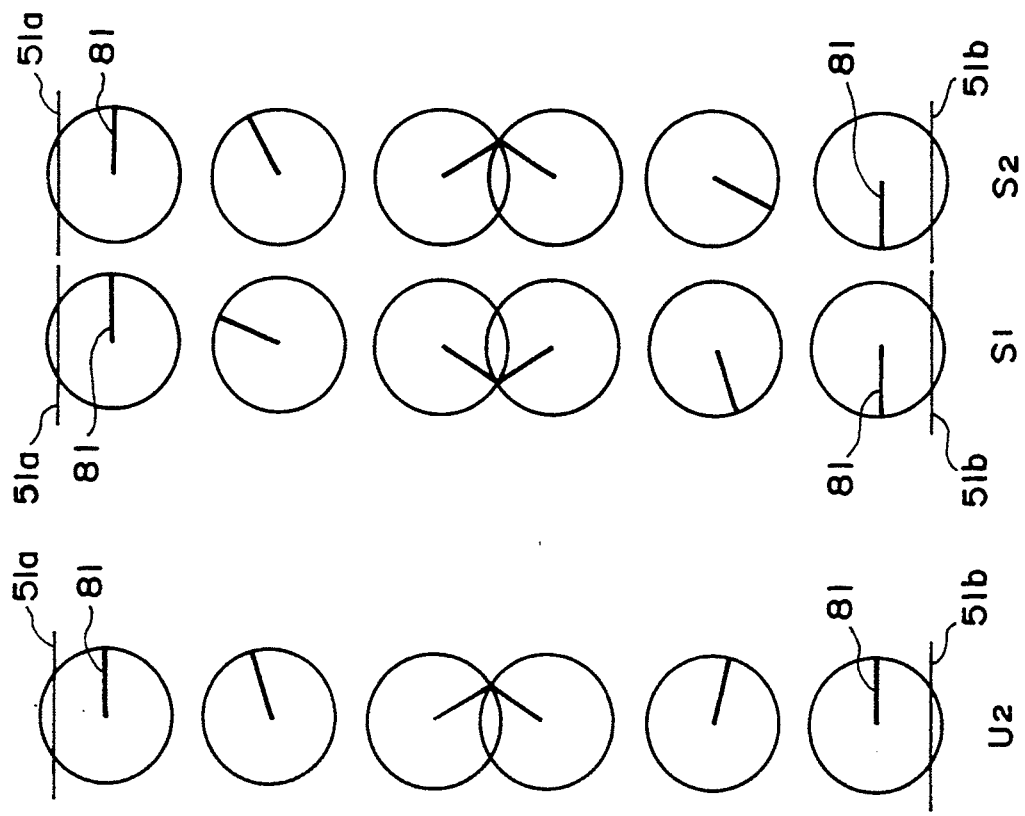
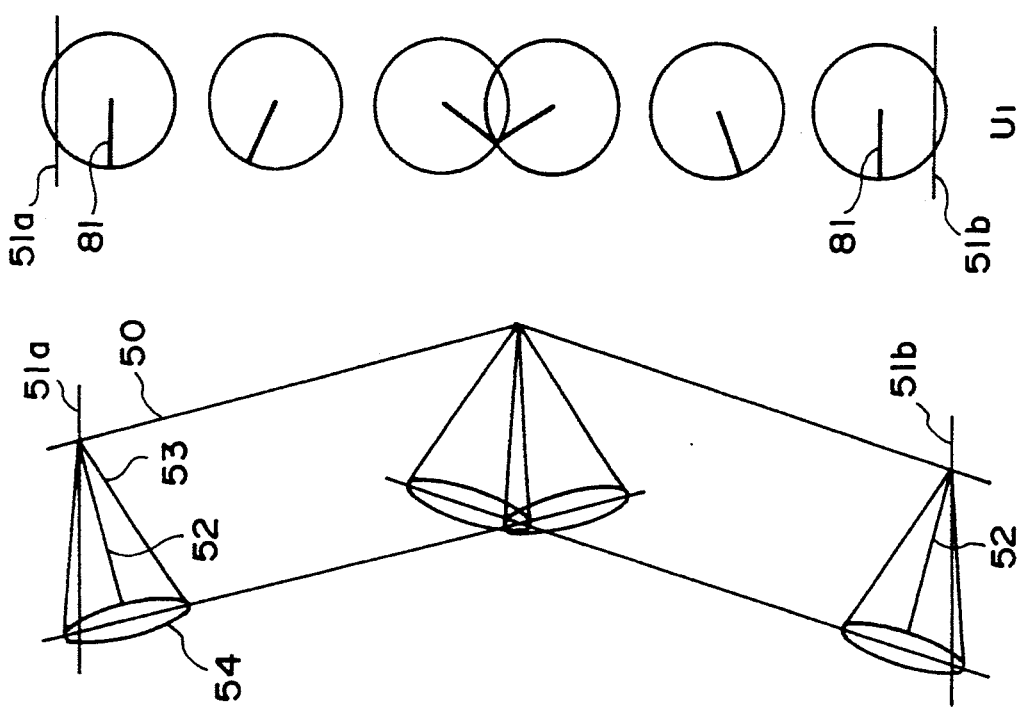
FIG. 6
FIG. 5
FIG. 4

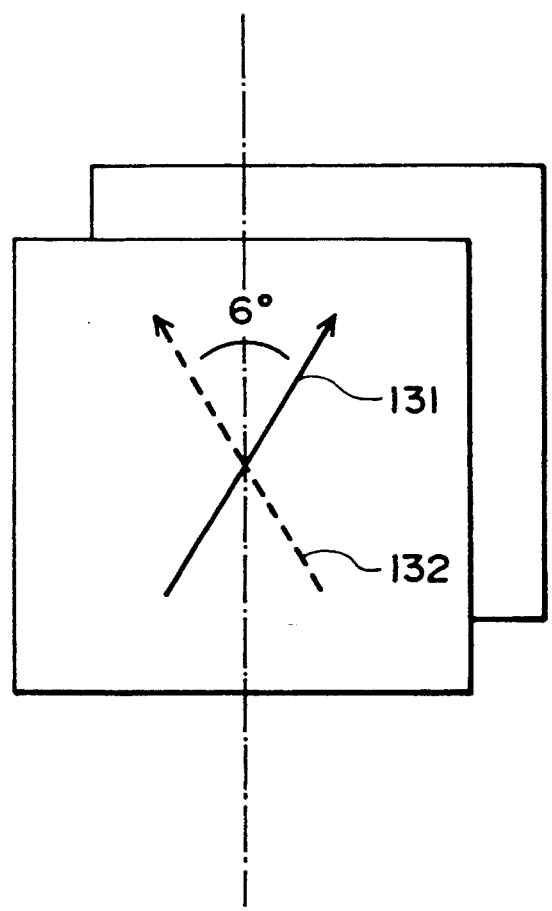
F I G. 14

LIQUID CRYSTAL DEVICE HAVING ALIGNMENT FILM WITH PARTICULAR SURFACE ENERGY DIFFERENCE BEFORE AND AFTER RUBBING

This application is a division of application Ser. No. 07/925,200, filed Aug. 6, 1992, now abandoned.

FIELD OF THE INVENTION AND RELATED ART

This invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, ect.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it-is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \sin^2(\Delta nd/\lambda)\pi,$$

wherein
$I_0$: incident light intensity,
$I$: transmitted light intensity,
$\theta$: tilt angle,
$\Delta n$: refractive index anisotropy,
$d$: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film or polyamide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle $(\text{H})$ (an angle shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle $(\text{H})$ in a helical structure. More specifically, it has been found that the tilt angle $\theta$ in a non-helical structure becomes smaller than the tilt angle $(\text{H})$ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle e,crc/H/ in the helical structure.

Further, in an alignment state of a chiral smectic liquid crystal attained by a conventional polyimide or polyamide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

SUMMARY OF THE INVENTION

Accordingly, an object of the present invention is to provide a ferroelectric liquid crystal device having solved the above-mentioned problems, particularly a ferroelectric liquid crystal device which provides a large tilt angle $\theta$ of a chiral smectic liquid crystal in a non-helical structure and provides a display capable of displaying a high-contrast image and yet free from after-image.

According to the present invention, there is provided a liquid crystal device, comprising a pair of substrates, at least one of which has an alignment film thereon, and a liquid crystal disposed between the substrates; wherein said alignment film has a surface energy of at most 35 dyne/cm before rubbing and has been rubbed to have a refractive index anisotropy of at least 0.02.

According to another aspect of the present invention, there is provided a liquid crystal device, comprising a pair of substrates, at least one of which has an alignment film thereon, and a liquid crystal disposed between the substrates; wherein said alignment film has a surface energy difference $\Delta E$ of at least 9 dyne/cm and a difference $\Delta \delta$ in dispersion term of the surface energy of at least 6 dyne/cm between before and after the rubbing.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a perspective view showing schematically an alignment of a chiral smectic liquid crystal having a helical structure. FIG. 3 is a perspective view showing schematically an alignment state of a chiral smectic liquid crystal having a non-helical structure.

FIG. 4 is a schematic sectional view showing an alignment state of a chiral smectic liquid crystal aligned according to the present invention. FIG. 5 is an illustration of C-director alignments in a uniform alignment state. FIG. 6 is an illustration of C-director alignments in a splay alignment state.

FIGS. 13 and 14 are respectively an illustration of rubbing directions intersecting with each other.

DETAILED DESCRIPTION OF THE INVENTION

Figure 1:
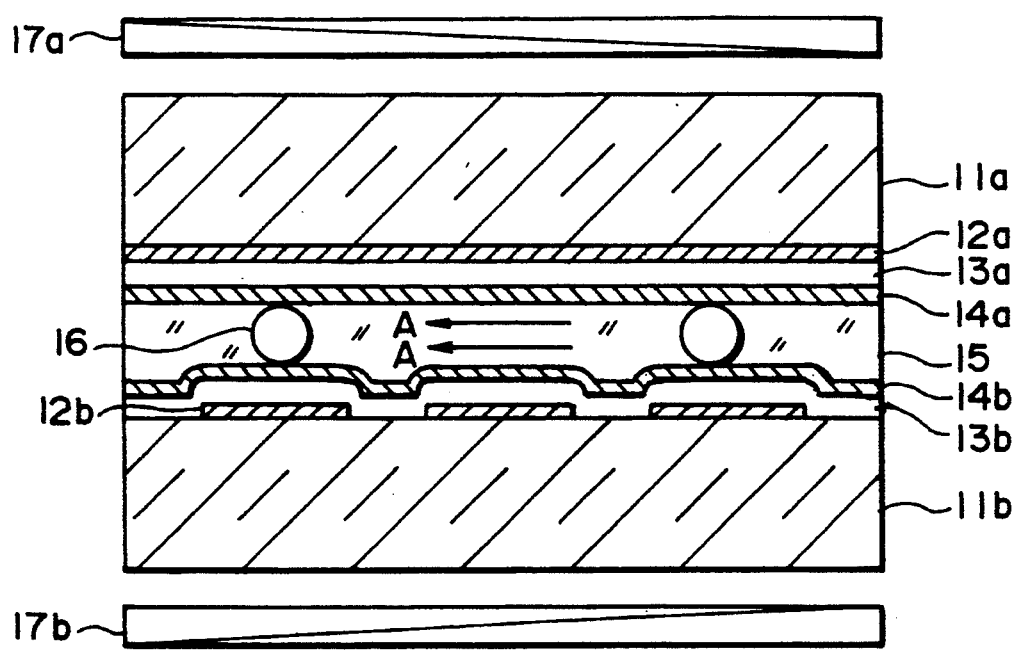
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200-1500 Å-thick insulating films 13a of $SiO_2$, $TiO_2$, $Ta_2O_5$, etc., and 50-1000 Å-thick alignment control films 14a and 14b of a polyimide or polyamide.

In this instance, the alignment control films 14a and 14b have been treated by rubbing in directions which are parallel to each other and in the same direction (indicated by arrows A in FIG. 1A). A chiral smectic liquid crystal 15 is disposed between the substrates 11a and 11b, and the spacing between the substrates 11a and 11b is set to provide the ferroelectric liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The cell structure thus formed is sandwiched between a pair of polarizers 17a and 17b.

In the present invention, the rubbing may preferably be applied to both of the alignment films 14a and 14b. In this instance, the rubbing directions to the alignment films 14a and 14b may be parallel identical directions as described above, parallel reverse directions, or slightly crossing identical directions forming an intersection angle of 2–20 degrees.

In the present invention, it has been found suitable to use a polyimide or polyamide alignment film having a low surface energy of at most 35 dyne/cm, preferably at most 32 dyne/cm and a refractive index anisotropy ($\Delta n$) which increases to a certain extent by rubbing so as to provide a ferroelectric liquid crystal device showing a large tilt angle and good display characteristics. As for the increase in refractive index anisotropy, an alignment film showing a smaller increase on the same surface energy level tends to provide better display characteristics.

Herein, the surface energy refers to a value measured by the sessile drop method using a contact angle meter, and the evaluation of the refractive index anisotropy is based on measurement by means of a high-sensitivity automatic birefringence meter using a photoelasticity modulation element.

The alignment film used in the present invention is not required to be composed of a material having a specific chemical structure as far as it satisfies the above-mentioned conditions, but may suitably be composed of materials enumerated for example below.

Thus, examples of tetracarboxylic acid components constituting polyimides may include pyromellitic dianhydride, biphenyltetracarboxylic dianhydride, naphthalenetetracarboxylic dianhydride, and cyclobutanetetracarboxylic dianhydride.

Examples of dicarboxylic acid components constituting polyamides may include: terephthalic acid, 4,4'-biphenyldicarboxylic acid, and 2,6-naphthalenedicarboxylic acid Further, examples of diamines constituting the polyimide or polyamide may include bis[4-(aminophenoxy)-phenyl]compounds represented by the following formula (I):

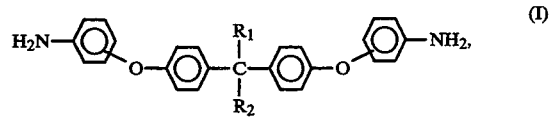

wherein $R_1$ and $R_2$ independently denote fluoroalkyl chains, such as $CF_3(CF_2)m(CH_2)_L$—(wherein $L \geq 0$, $m \geq 0$), and $R_1$ and $R_2$ may be the same or different.

In order to form a film of the polyimide or polyamide on a substrate, a solution of a polyamide acid as a precursor of the polyimide or the polyamide per se in a solvent, such as dimethylformamide, dimethylacetamide, dimethylsulfoxide, or N-methyl-2-pyrrolidone, at a concentration of 0.01–40 wt. %, may be applied onto the substrate by spinner coating, spray coating, roller coating, etc., and heated to 100°–350° C., preferably 200°–300° C., for dehydrocyclization to form the polyimide film or for evaporation of the solvent to form the polyamide film. The thus-formed polyimide or polyamide film may be rubbed with a cloth, etc. The polyimide or polyamide film used in the present invention may be formed in a thickness of about 30 Å–1 μm, preferably 200–2000 Å. In this case, the insulating films 13a and 13b shown in FIG. 1 can be omitted. Further, in the case of forming the polyimide or polyamide film on the insulating film 13a or 13b, the polyimide or polyamide film may be formed in a thickness of at most 500 Å, preferably at most 300 Å.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 microns or longer in cholesteric phase (measured at a mid temperature in the cholesteric range). Preferred examples of such a liquid crystal material may include liquid crystal materials (1)–(5) below comprising the following liquid crystals "LC-1", "80B" and "80SI*" in the indicated proportions by weight.

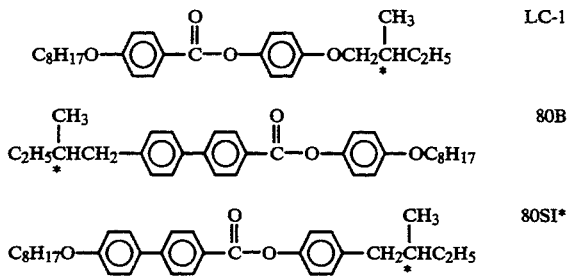

Liquid crystal material
(1) (LC-1)$_{90}$/(80B)$_{10}$
(2) (LC-1)$_{80}$/(80B)$_{20}$
(3) (LC-1)$_{70}$(80B)$_{30}$
(4) (LC-1)$_{60}$/(80B)$_{40}$
(5) (80SI*)$_{100}$ FIG. 2 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermeticallydisposed therebetween. Full lines 23 show liquid crystal molecules, and disposed on cones forming in succession a helical structure in the direction of extension of the substrates. A half of the apex angle of the cone provides a tilt angle (H) in the helical structure of the chiral smectic phase. Each liquid crystal molecule 23 has a dipole moment (P⊥) 24 in a direction perpendicular to the axis thereof. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P_) 24 are all directed in the direction of the electric field. The liquid crystal molecules 23 have an elongated shape and show a refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b. A half of the angle between the first and second stable states corresponds to a tilt angle θ.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at U$_1$ are shown C-directors 81 (each being a projection of a molecular long axis onto an imaginary plane perpendicular to the normal to a molecular layer 50) in one stable orientation state, and at $U_2$ are shown C-directors 81 in the other stable orientation state.

On the other hand, an alignment state attained by a conventional rubbing-treated polyimide film may be represented by a C-director diagram of FIG. 6, which shows an alignment state wherein molecular axes are twisted in a large degree from the upper substrate 51a to the lower substrate 51b to provide a smaller tilt angle $\theta$.

Figure 7A:
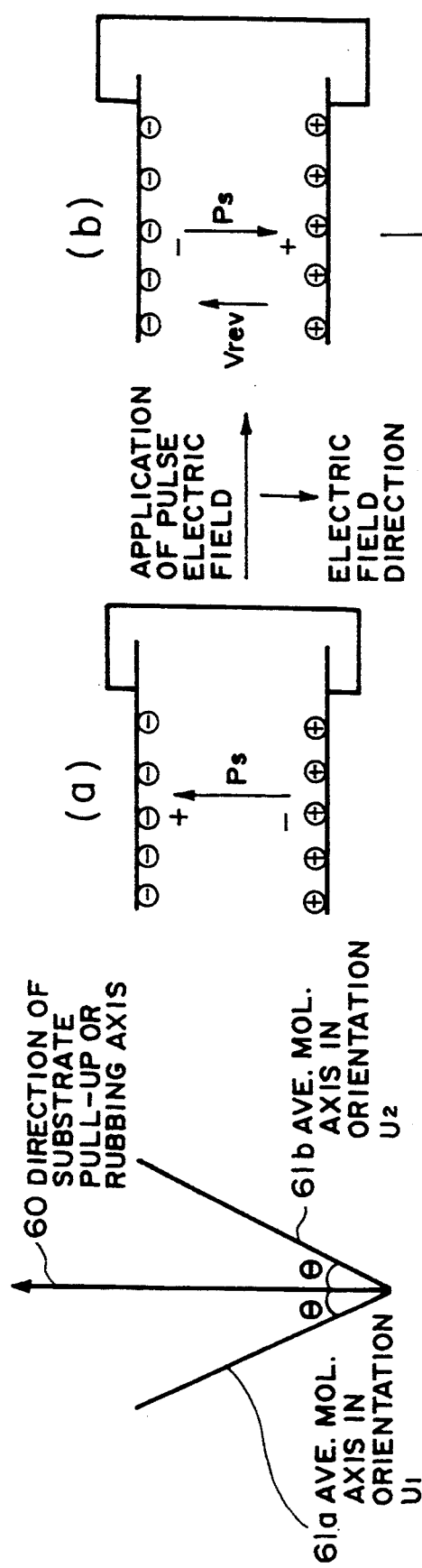
FIGS. 7A and 7B are plan views illustrating tilt angles $\theta$ in a uniform alignment state and a splay alignment state, respectively.
Figure 7B:
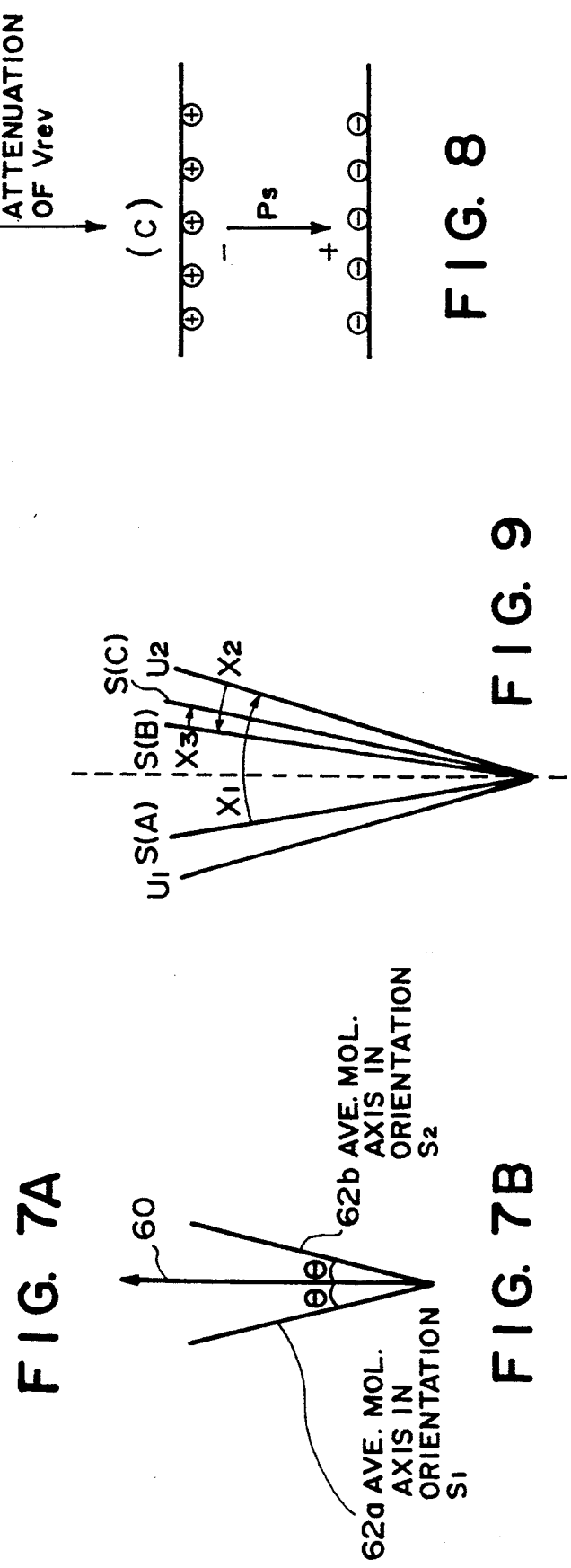

FIG. 7A is a schematic plan view illustrating a tilt angle $\theta$ in an alignment state where C-directors 81 assume a state shown in FIG. 5 (referred to as "uniform alignment state"), and FIG. 7B is a schematic plan view illustrating a tilt angle $\theta$ in an alignment state where C-directors 81 assume a state shown in FIG. 6 (referred to as "splay alignment state"). In these figures, reference numeral 60 denotes a rubbing axis provided to the above-mentioned specific polyamide or polyamide film according to the present invention, numeral 61a denotes an average molecular axis in the orientation state $U_1$, numeral 61b denote an average molecular axis in the orientation state $U_2$, numeral 62a denotes an average molecular axis in the orientation state $S_1$, and numeral 62b denotes an average molecular axis in the orientation state $S_2$. The average molecular axes 61a and 61b an be switched to each other by applying voltages of mutually opposite polarities. Similar switching is caused between the average molecular axes 62a and 62b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by CLC and the spontaneous polarization of the liquid crystal is denoted by $P_S$, Vrev causing after-image is expressed by the following equation.

$$V_{rev} = 2P_S/(C_i + C_{LC})$$

Figure 8:
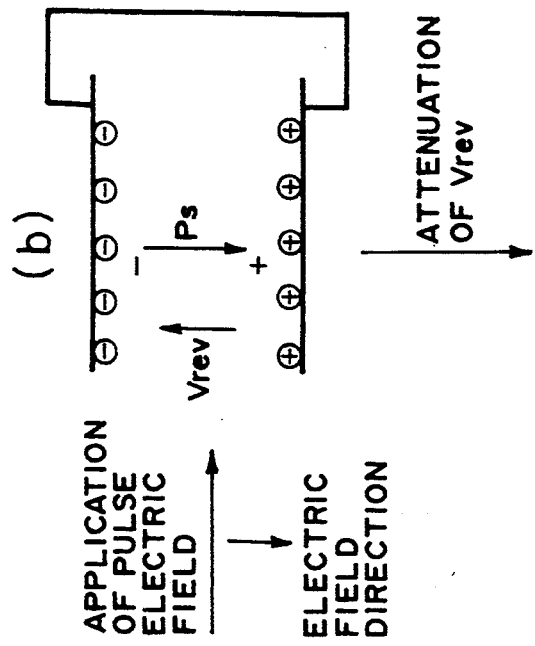
FIG. 8 is a sectional view showing a charge distribution, a direction of a spontaneous polarization $P_S$ and a direction of a reverse electric field Vrev.

FIG. 8 is a schematic sectional view illustrating changes in charge distribution direction of $P_S$ and direction of the reverse electric field in a liquid crystal cell. At FIG. 8(a), there is shown a distribution of $\oplus$ and $\ominus$ charges in a memory state before application of a pulse electric field, where the spontaneous polarization is directed from $\oplus$ charges to $\ominus$ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stale orientation state to the other orientation state) but the distribution of the $\oplus$ and $\ominus$ charges is similar to that shown at FIG. 8(a), so that a reverse electric field Vrev is generated as indicated by an arrow shown at FIG. 8(b). The reverse electric field Vrev disappears in a short time to provide a distribution of $\oplus$ and $\ominus$ charges as shown at FIG. 8(c).

Figure 9:
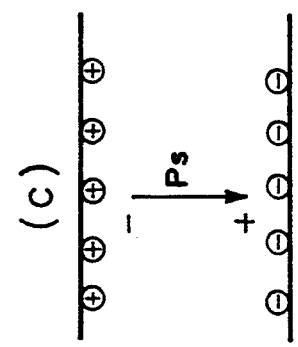
FIG. 9 is a schematic plan view illustrating changes in tilt angle $\theta$ during and after application of an electric field.
Figure 10:
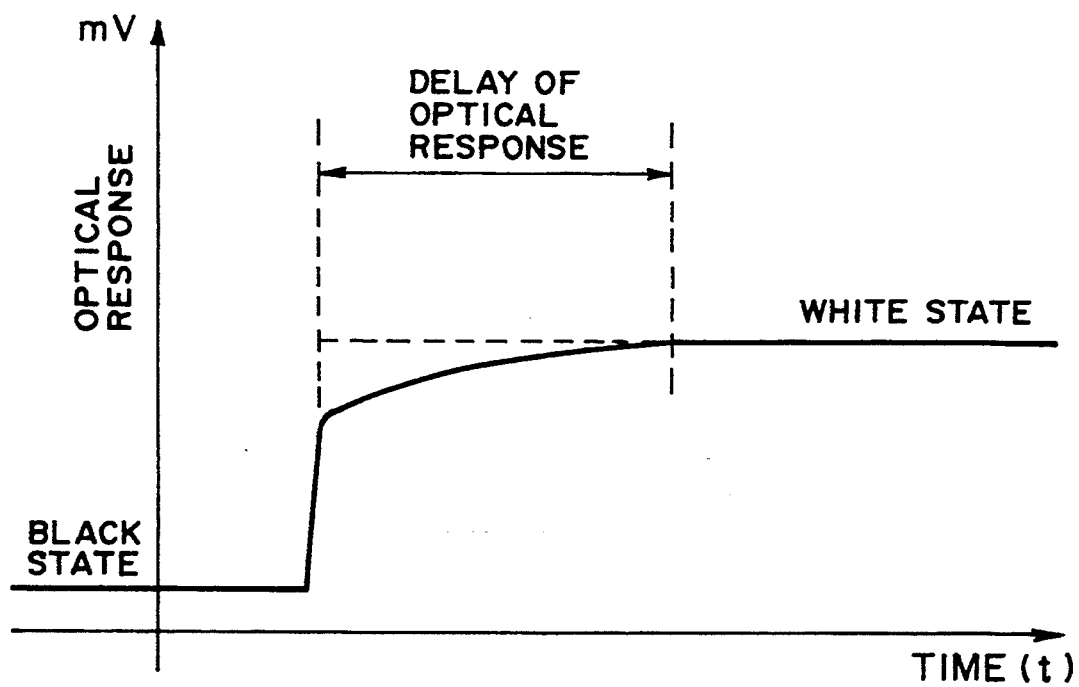
FIGS. 10 and 11 are graphs showing optical response characteristics according to a conventional device and the present invention, respectively.

FIG. 9 is a plan view showing a change in optical response in a splay alignment state given by a conventional polyimide or polyamide alignment film in terms of a change in tilt angle $\theta$. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle $\textcircled{H}$ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle $\theta$. FIG. 10 is a graph showing an optical response at this time.

Figure 11:
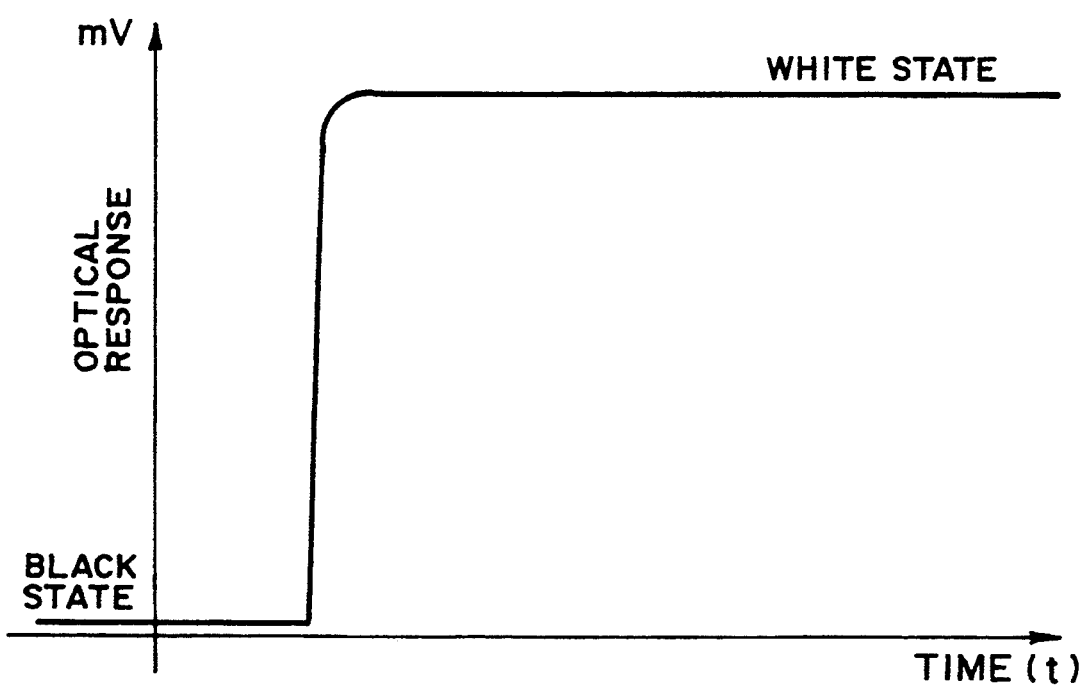

In the present invention using an alignment film having a low surface energy of at most 35 dyne/cm before rubbing or in an as-coated state and caused to have an increased refractive index anisotropy ($\Delta n$) by rubbing as described above, the average molecular axes S(A), S(B) and S(C) in the splay alignment state shown in FIG. 9 are not caused but it is possible to form an alignment state with an average molecular axis giving a tilt angle $\theta$ which is close to a maximum tilt angle $\textcircled{H}$. An optical response at this time is shown in FIG. 11. FIG. 11 shows that a delay in optical response causing after-image is obviated, and a high contrast in memory states is caused.

Thus, in the liquid crystal device according to the present invention using a rubbing-treated specific polyimide or polyamide film as aligning means, it has become possible to realize an alignment state which provides a large optical contrast between the bright and dark states, particularly a large contrast in non-selected pixels during multiplexing drive as taught by U.S. Pat. No. 4,655,561, and is free from delay in optical response at the time of switching (multiplex driving) causing after-image during display.

Hereinbelow, the present invention will be explained based on Examples.

EXAMPLE 1

Two 1.1 mm-thick glass plates each provided with a 1000 Å-thick ITO-film were respectively coated with a 3.0 wt. % solution of a polyamide acid represented by the formula (II) shown below in a mixture solvent of N-methylpyrrolidone/n-butylcellosolve=5/1 by spin coating.

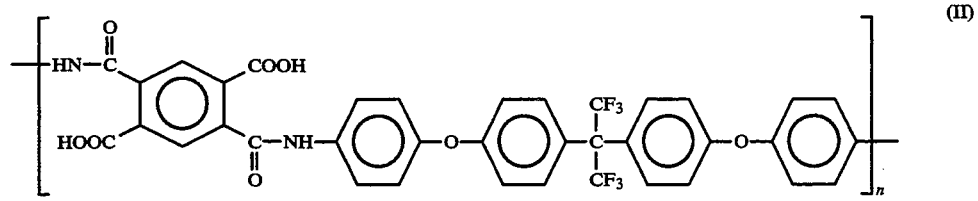

(II)

After the coating, the film was subjected to curing under heating at 250° C. for about an hour to form a 226 Å-thick film.

The coating film thus formed was subjected to measurement of a contact angle by the sessile drop method using a contact angle meter (available from Kyowa Kaimen Kagaku K. K.), from which the surface energy $\gamma_s(=\gamma^d+\gamma^p+\gamma^h$, wherein $\gamma^d$:dispersion term $\gamma^p$:polarity term, and $\gamma^h$:hydrogen bond term) was calculated to be 31.4 dyne/cm.

Further, the coating film was found to have a refractive iAdex anisotropy $\Delta n=0.0066$ as measured by using a high-sensitivity automatic birefringence meter (available from OPC Seisakusho K. K.).

The coating film was then rubbed in one direction with a nylon-planted cloth. The rubbed coating film showed a refractive index anisotropy $\Delta n=0.0221$, and thus the change in $\Delta n$ due to the rubbing was 0.0155.

On one of the two substrates thus treated alumina beads with an average diameter of 1.5 μm were dispersed, and the other substrate was superposed thereon so that their rubbing axes were parallel to each other and disposed in the same direction to form a blank cell. The blank cell was filled with a ferroelectric smectic liquid crystal ("CS-1014" (trade name), available from Chisso K. K.) under vacuum and, after sealing, was gradually cooled from isotropic phase at a rate of 5° C./hour to 30° C., whereby an alignment was effected. The "CS-1014" liquid crystal in the cell showed the following phase transition series.

Iso. $\xrightarrow{80.5°\ C.}$ Ch. $\xrightarrow{69.1°\ C.}$ SmA $\xrightarrow{50°\ C.}$ SmC*

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle $\theta=15$ degrees, transmittance in the brightest state=28%, transmittance in the darkest state=1%, contrast ratio=28:1.

The delay in optical response causing after-image was 0.2 sec or less.

Figure 12:
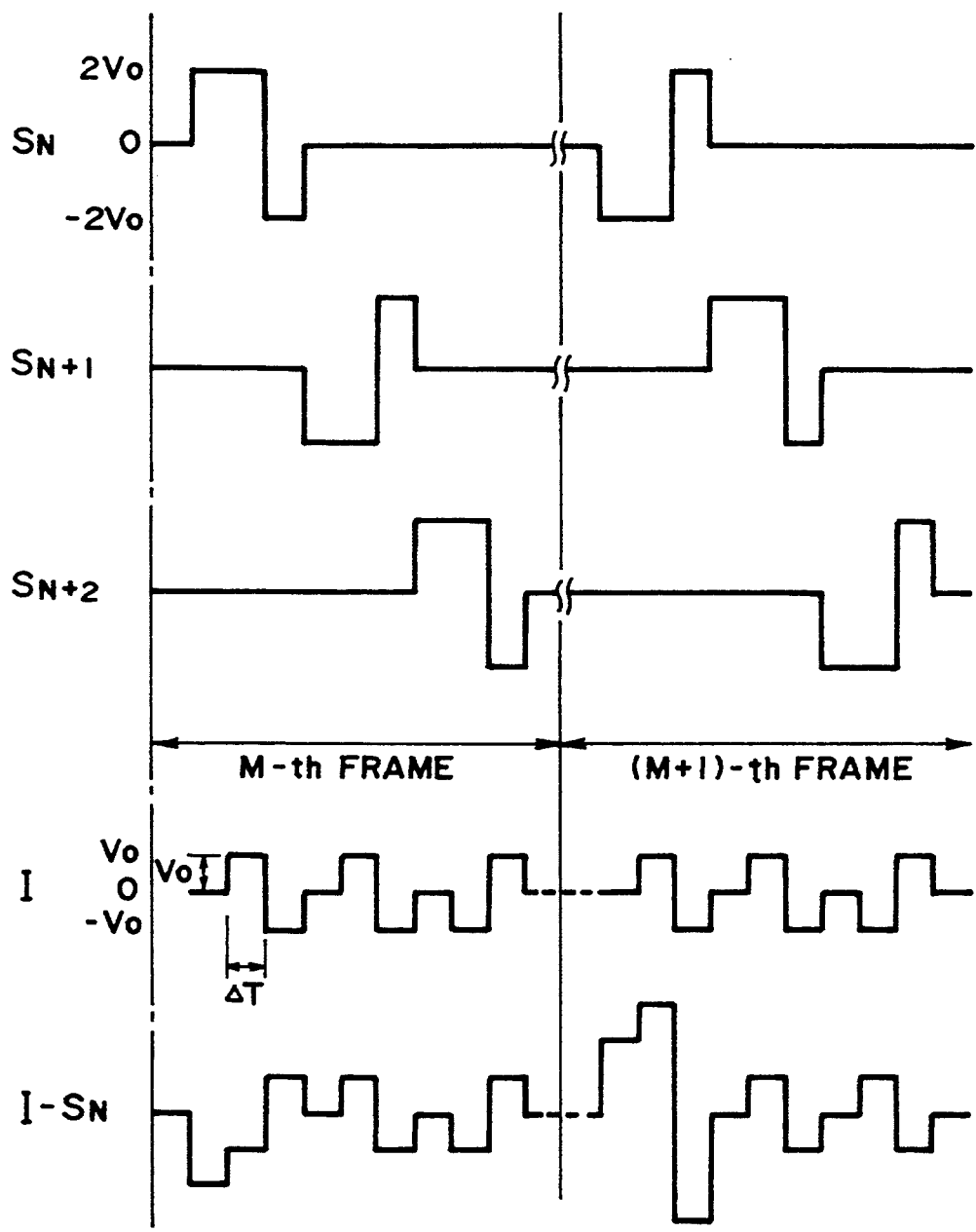
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at $(I-S_N)$ is shown a combined voltage waveform applied to the data line I and the scanning line $S_N$. In the above embodiment, the drive was performed under the conditions of $V_0=5-8$ volts and $\Delta T=20-70$ μsec.

EXAMPLE 2

A liquid crystal device was prepared and evaluated in the same manner as in Example 1 except that polyimide alignment films prepared from a polyamide acid represented by the following structural formula (III) were used:

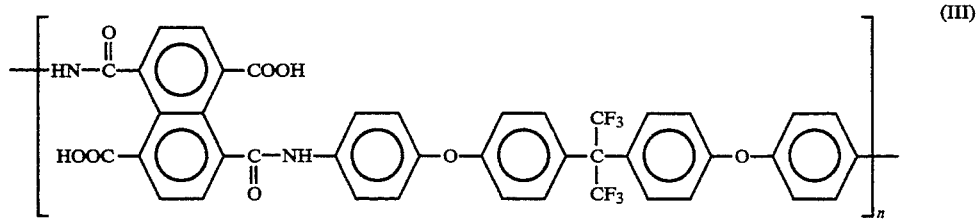
(III)

The alignment film before rubbing showed a surface energy $\gamma_s=31.1$ dyne/cm and a refractive index anisotropy $\Delta n=0.0154$ and, after rubbing, showed a refractive index anisotropy $\Delta n=0.0241$, thus showing a change in $\Delta n$ of 0.0087 due to the rubbing.

The resultant device showed a contrast ratio of 35:1 and a delay time in optical response of 0.1 sec.

As a result of the multiplexing drive in the same manner as in Example 1, the liquid crystal device showed similarly good results as in Example 1 with respect to contrast and after-image.

EXAMPLE 3

A liquid crystal device was prepared and evaluated in the same manner as in Example 1 except that polyimide alignment films prepared from a polyamide acid represented by the following structural formula (IV) were used:

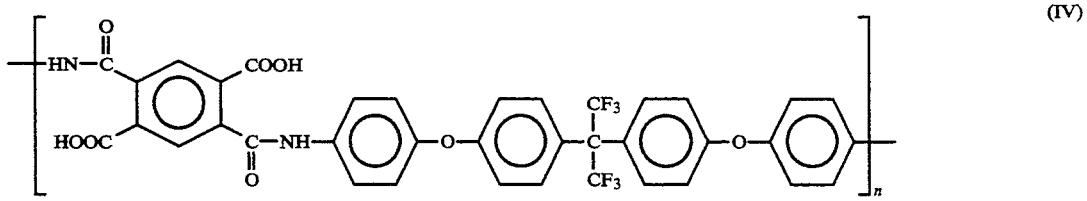
(IV)

-continued

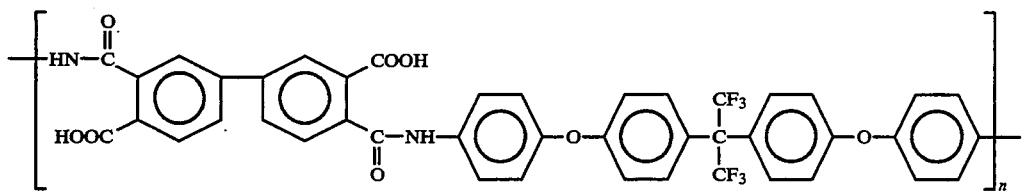

The alignment film before rubbing showed a surface energy $\gamma_s=30.5$ dyne/cm and a refractive index anisotropy $\Delta n=0.0122$ and, after rubbing, showed a refractive index anisotropy $\Delta n=0.0454$, thus showing a change in $\Delta n$ of 0.0332 due to the rubbing.

The resultant device showed a contrast ratio of 32:1 and a delay time in optical response of 0.1 Sec.

As a result of the multiplexing drive in the same manner as in Example 1, the liquid crystal device showed similarly good results as in Example 1 with respect to contrast and after-image.

EXAMPLE 4

A liquid crystal device was prepared and evaluated in the same manner as in Example 1 except that alignment films of a polyamide represented by the following structural formula (V) were used:

The resultant device showed a contrast ratio of 20:1 and a delay time in optical response of 0.5 sec.

As a result of the multiplexing drive in the same manner as in Example 1, the liquid crystal device showed similarly good results as in Example 1 with respect to contrast and after-image.

Comparative Examples 1-3

Liquid crystal devices were prepared and evaluated in the same manner as in Example 1 except that each pair of alignment films were composed of a polyamide (Comparative Example 1) or polyimides (Comparative Examples 2 and 3) respectively represented by the formulae shown below: Comparative Example 1

[Comparative Example 1]

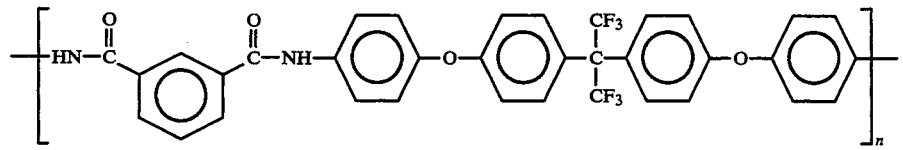

[Comparative Example 2]

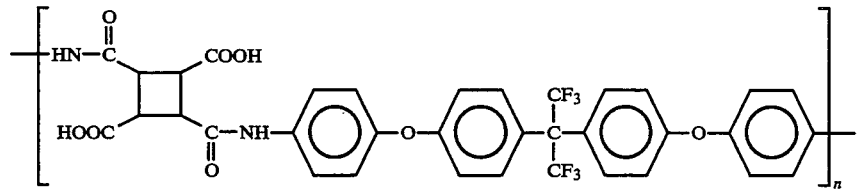

[Comparative Example 3]

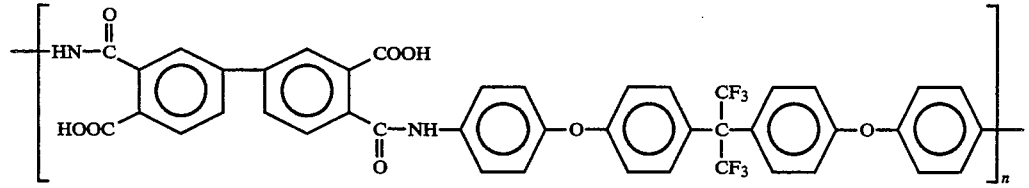

The respective alignment films showed a surface energy $\Delta_s$ and a refractive index anisotropy $\gamma n$ before rubbing, and a refractive index anisotropy $\gamma n$ after rub-

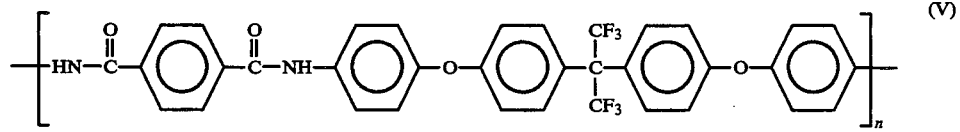

(V)

The alignment film before rubbing showed a surface energy $\gamma_s=33.4$ dyne/cm and a refractive index anisotropy $\Delta n=0.0333$ and, after rubbing, showed a refractive index anisotropy $\Delta n=0.0600$, thus showing a change in $\Delta n$ of 0.0267 due to the rubbing.

bing and a change in $\gamma n$ due to rubbing shown in Table 1 below. The performances of the resultant liquid crystal devices regarding the contrast ratio and delay in optical response are also shown in Table 1 below.

TABLE 1

| | Alignment film | | | | Device performance | |
|---|---|---|---|---|---|---|
| | Before rubbing | | After rubbing | | | Delay |
| | $\gamma_s$ (dyne/cm) | $\Delta n$ | $\Delta n$ | $\Delta n$ change | Contrast ratio | time (sec) |
| Comp. Ex. 1 | 41.0 | 0.0542 | 0.0188 | −0.0354 | 7:1 | 2.0 |
| Comp. Ex. 2 | 36.7 | 0.0124 | 0.0156 | 0.0032 | 10;1 | 1.2 |
| Comp. Ex. 3 | 42.7 | 0.0207 | 0.0249 | 0.0042 | 8:1 | 2.2 |

As is understood from the results of the above Examples and Comparative Examples, remarkable improvements in contrast ratio and delay time of optical response, particularly regarding contrast during multiplexing drive, were realized by using an alignment film showing a surface energy of at most 35 dyne/cm, preferably at most 32 dyne/cm, and a refractive index anisotropy $\Delta n$ after rubbing of at least 0.02, preferably in the range of 0.025–0,075.

EXAMPLE 5

Two 1.1 mm-thick glass plates each provided with 1000 Å-thick ITO electrodes were respectively coated with a 2.5 wt. % solution of a polyimide precursor ("LQ1802" available from Hitachi Kasei K. K.) in a mixture solvent of N-methylpyprrolidone/n-butylcellosolve=1/1 by means of a spinner rotating at 3000 rpm, followed by heating at 250° C. for 1 hour to form a 400 Å-thick coating film. The coating film was then rubbed in one direction to show a surface energy of 43.9 dyne/cm which was larger by 11.6 dyne/cm than the value before the rubbing. The increase in dispersion term due to the rubbing was 11.2 dyne/cm.

Figure 13:
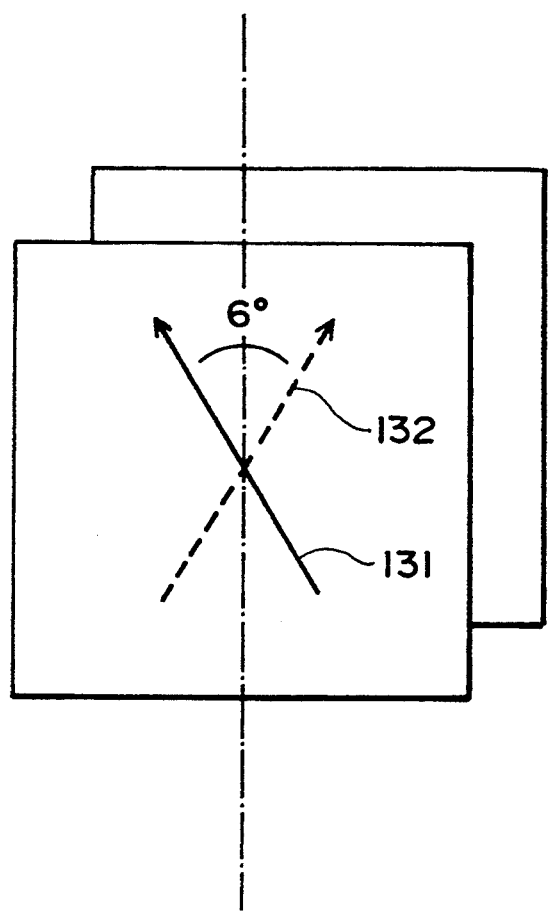

On one of the two substrates thus prepared, alumina beads with an average diameter of about 1.5 μm were dispersed, and the other substrate was superposed thereon so that their rubbing directions extended in almost the same directions but the rubbing direction of the upper substrate deviated by 6 degrees anti-chlockwise from that of the lower substrate as shown in FIG. 13 to form a blank cell.

The blank cell was then filled with a phenylpyrimidine-based mixture liquid crystal under vacuum and, after sealing, was gradually cooled from. isotropic phase at a rate of 1° C./hour to 30° C., whereby an alignment was effected. More specifically, the phenyl-pyrimidine-based mixture liquid crystal was one showing a tilt angle of 15.4 degrees at room temperature, a spontaneous polarization of −6.8 nC/cm², a tilt angle $\theta$ of 15.4 degrees and a pitch of −17 μm in chiral smectic C phase, and the following phase transition series:

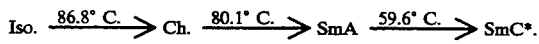

Iso. $\xrightarrow{86.8° C.}$ Ch. $\xrightarrow{80.1° C.}$ SmA $\xrightarrow{59.6° C.}$ SmC*.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle $\theta$=12 degrees, transmittance in the brightest state=36%, transmittance in the darkest state=1.2%, contrast ratio=30:1.

The liquid crystal device was subjected to multiplexing drive for display using driving waveforms shown in FIG. 12, whereby a high-quality display with a high contrast was attained. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5-8 volts and $\Delta T$=20-70 sec.

EXAMPLE 6

A liquid crystal device was prepared and evaluated in the same manner as in Example 5 except that alignment films were prepared from another polyimide precursor ("LX-S401"(trade name), available from Hitachi Kasei K. K.). The contrast and surface energy values obtained thereby are shown in Table 2 below.

As a result of the multiplexing drive in the same manner as in Example 5, a high contrast display was performed similarly as in Example 5.

EXAMPLE 7

A liquid crystal device was prepared and evaluated in the same manner as in Example 5 except that another ferroelectric liquid crystal ("ZLI-4273"(trade name), available from Merck & Co., Inc.) was used instead of the phenyl-pyrimidine-based mixture liquid crystal. The contrast and surface energy values obtained thereby are shown in Table 2 below.

As a result of the multiplexing drive in the same manner as in Example 5, a high contrast display was performed similarly as in Example 5.

Comparative Example 4

A liquid crystal device was prepared and evaluated in the same manner as in Example 5 except that alignment films were prepared from another polyimide precursor ("SE-100"(trade name), available from Nissan kagaku K.K.). The contrast and surface energy values obtained thereby are shown in Table 2 below.

As a result of the multiplexing drive in the same manner as in Example 5, the resultant contrast was lower than in Example 5.

Comparative Example 5

A liquid crystal device was prepared and evaluated in the same manner as in Example 5 except that alignment films were prepared from another polyimide precursor ("LQ-5200"(trade name), available from Hitachi Kasei K. K.). The contrast and surface energy values obtained thereby are shown in Table 2 below.

As a result of the multiplexing drive in the same manner as in Example 5, the resultant contrast was lower than in Example 5.

EXAMPLE 8

A liquid crystal device was prepared and evaluated in the same manner as in Example 5 except that the two substrates were superposed with each other so that the rubbing direction of the upper substrate deviated by 6 degrees clockwise from that of the lower substrate as show in FIG. 14. The contrast and surface energy values obtained thereby are shown in Table 2 below.

As a result of the multiplexing drive in the same manner As in Example 5, the resultant contrast was slightly lower than in Example 5.

TABLE 2

|  | Contrast | Difference due to rubbing | |
|---|---|---|---|
|  |  | in surface energy (dyne/cm) | in dispersion term (dyne/cm) |
| Ex. 6 | 28:1 | 14.9 | 15.6 |
| Ex. 7 | 32:1 | 11.6 | 11.2 |
| Comp. |  |  |  |
| Ex. 4 | 5:1 | 1.4 | 0.7 |
| Ex. 5 | 4:1 | 1.1 | 0 |
| Ex. 8 | 22:1 | 11.6 | 11.2 |

As is understood from the above Examples 5–8 and Comparative Examples 4–5, remarkable improvements in contrast, particularly during multiplexing drive, were realized by using an alignment film showing a surface energy difference ΔE due to rubbing of at least 9 dyne/cm, preferably 9–20 dyne/cm, and a difference Δδ n in dispersion term of surface energy due to rubbing of at least 6 dyne/cm, preferably 6–20 dyne/cm.

What is claimed is:

1. An electro plate for a liquid crystal device, comprising: a substrate, and an alignment film formed on the substrate; wherein said alignment film has a surface energy difference ΔE of at least 9 dyne/cm and a difference Δδ in dispersion term of the surface energy of at least 6 dyne/cm between the surface energy, the dispersion term before and after rubbing.

2. An electrode plate according to claim 1, wherein said ΔE is 9–20 dyne/cm.

3. An electrode plate according to claim 1, wherein said Δδ is 6–20 dyne/cm.

4. A liquid crystal device, comprising a pair of substrates, at least one of which has an alignment film thereon, and a liquid crystal disposed between the substrates; wherein said alignment film has a surface energy difference ΔE of at least 9 dyne/cm and a difference Δδ in dispersion term of the surface energy of at least 6 dyne/cm between the surface energy, the dispersion term before and after rubbing.

5. A device according to claim 4, wherein said ΔE is 9–20 dyne/cm.

6. A device according to claim 4, wherein said Δδ is 6–20 dyne/cm.

7. A device according to claim 4, wherein said alignment film subjected to rubbing is provided to both substrates.

8. A device according to claim 7, wherein the alignment films provided to both substrates have been rubbed in directions which are parallel to each other and identical to each other.

9. A device according to claim 7, wherein the alignment films provided to both substrates have been rubbed in directions which are parallel to each other and opposite to each other.

10. A device according to claim 7, wherein the alignment films provided to both substrates have been rubbed in directions which are almost identical to each other but cross each other an intersection angle of 2–20 degrees.

11. A device according to claim 4, wherein the alignment film is formed of a polyimide resin.

12. A device according to claim 4, wherein the alignment film is formed of a polyamide resin.

13. A device according to claim 4, wherein the liquid crystal is a chiral smectic liquid crystal.

14. A liquid crystal apparatus, including:
(a) a liquid crystal panel comprising a pair of substrates having thereon scanning electrodes and data electrodes, respectively, so as to form an electrode matrix, at least one of the substrates further having thereon an alignment film; and a liquid crystal disposed between the substrates; and
(b) drive means for applying a scanning signal to the scanning electrodes and applying data signals to the data electrodes in synchronism with the scanning signal;
wherein said alignment film has a surface energy difference ΔE of at least 9 dyne/cm and a difference Δδ in dispersion term of the surface energy of at least 6 dyne/cm between the surface energy, the dispersion term before and after rubbing.

15. An apparatus according to claim 14, wherein said liquid crystal is a chiral smectic liquid crystal.

* * * * *

UNITED STATES PATENT AND TRADEMARK OFFICE
CERTIFICATE OF CORRECTION

PATENT NO. : 5,400,159
DATED : March 21, 1995
INVENTOR(S) : HIDEAKI TAKAO, ET AL.

Page 1 of 3

It is certified that error appears in the above-identified patent and that said Letters Patent is hereby corrected as shown below:

COLUMN 1

Line 23, "ect.)." should read --etc.).--.
Line 37, "it-is" should read --it is--.

COLUMN 2

Line 43, "e,crc/H/" should read --(H)--.

COLUMN 4

Line 54 "acid" ahould read --acid.--.
Line 67, "$CF_3(CF_2)m(CH_2)_L$-" should read --$CF_3(CF_2)_m(CH_2)_L$- --.

COLUMN 5

Line 48, "$(3)(LC-1)_{70}(80B)_{30}$" should read --$(3)(LC-1)_{70}/(80B)_{30}$--.
Line 60, "hermeticallydisposed" should read --hermetically disposed--.

COLUMN 6

Line 6, "moment (P_) 24" should read --moment (P$\perp$) 24--.
Line 64, "cone 54." should read --cone 53.--.

COLUMN 7

Line 24, "an" should read --can--.
Line 33, "CLC" should read --$C_{LC}$--.
Line 50, "stale" should read --stable--.

UNITED STATES PATENT AND TRADEMARK OFFICE
CERTIFICATE OF CORRECTION

PATENT NO. : 5,400,159
DATED : March 21, 1995
INVENTOR(S) : HIDEAKI TAKAO, ET AL.

It is certified that error appears in the above-identified patent and that said Letters Patent is hereby corrected as shown below:

COLUMN 8

Line 49, "ITO-film" should read --ITO film--.

COLUMN 9

Line 5, "term" should read --term,--.
Line 9, "iAdex" should read --index--.

COLUMN 11

Line 17, "Sec." should read --sec.--.

COLUMN 12

Line 24, "Comparative Example 1" should be deleted.
Line 54, "energy $\Delta_s$" should read --energy $\gamma_s$-- and "anisotropy $\gamma n$" should read --anisotropy $\Delta n$--.
Line 55, "anisotropy $\gamma n$" should read --anisotropy $\Delta n$--.
Line 65, "$\gamma n$" should read --$\Delta n$--.

COLUMN 13

Line 29, "N-methylpyprrolidone/" should read --N-methylpyrrolidone/--.
Line 42, "anti-chlock-" should read --counter-clock- --.
Line 47, "from." should read --from--.

UNITED STATES PATENT AND TRADEMARK OFFICE
CERTIFICATE OF CORRECTION

PATENT NO. : 5,400,159
DATED : March 21, 1995
INVENTOR(S) : HIDEAKI TAKAO, ET AL.

It is certified that error appears in the above-identified patent and that said Letters Patent is hereby corrected as shown below:

COLUMN 14

Line 16, "$\Delta T=20-70$ sec." should read --$\Delta T=20-70$ μsec.--.
Line 45, "kagaku" should read --Kagaku--.

COLUMN 15

Line 4, "As" should read --as--.
Line 17, "Examples 5-8" should read --Examples 6-8--.
Line 22, "difference $\Delta\delta$ n" should read --difference $\Delta\delta$--.

Signed and Sealed this

Fourth Day of July, 1995

BRUCE LEHMAN

*Attest:*

*Attesting Officer*    *Commissioner of Patents and Trademarks*